United States Patent
Linecker

[11] 4,024,803
[45] May 24, 1977

[54] BUILDING VENTILATION SYSTEM

[76] Inventor: Josef Linecker, Rosengasse 5, Nattighofen, Austria, A 5230

[22] Filed: May 29, 1975

[21] Appl. No.: 581,798

[30] Foreign Application Priority Data

May 31, 1974 Austria .................. 4554/74

[52] U.S. Cl. .................... 98/33 R; 52/2
[51] Int. Cl.² ..................... F24F 13/00
[58] Field of Search ........... 98/33 R, 33 A; 52/2

[56] References Cited

UNITED STATES PATENTS

| | | |
|---|---|---|
| 2,281,002 | 4/1942 | Eck .................. 98/33 R |
| 2,291,220 | 7/1942 | Germonprez ......... 98/33 A |
| 3,049,067 | 8/1962 | Claude .............. 98/33 R |
| 3,223,018 | 12/1965 | Tucker, Sr. ......... 98/33 R |
| 3,252,400 | 5/1966 | Madl, Jr. ........... 98/33 R |
| 3,367,257 | 2/1968 | Raider et al. ....... 98/33 R |
| 3,727,538 | 4/1973 | Jacobson, Jr. ....... 98/33 A |

Primary Examiner—Lloyd L. King
Attorney, Agent, or Firm—Kurt Kelman

[57] ABSTRACT

A building, such as a hall, has a preferably vaulted ceiling comprised of spaced webs defining air spaces therebetween and an air stream is produced in at least one of the spaces for cooling or heating the building chamber.

8 Claims, 13 Drawing Figures

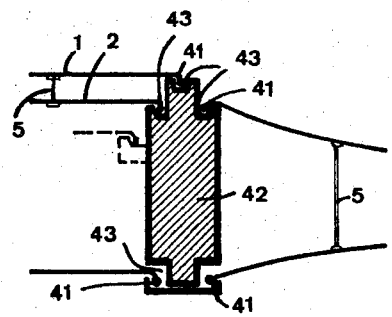
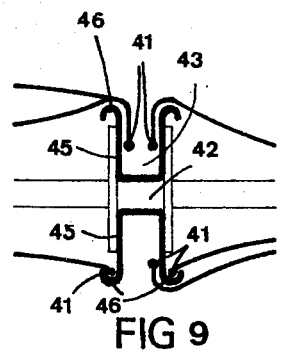
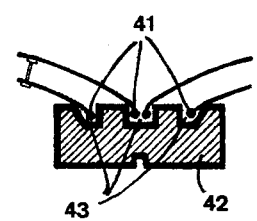
FIG 8　　　　FIG 9　　　　FIG 10
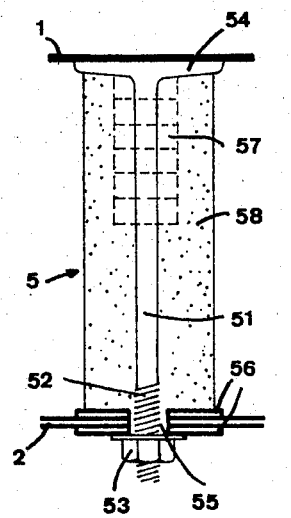
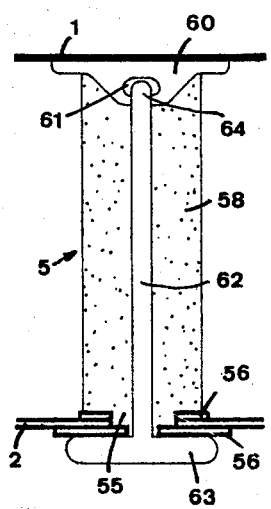
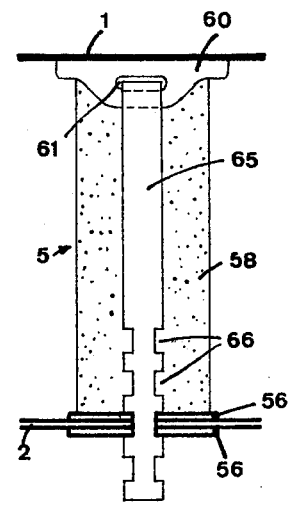
FIG 11　　　　FIG 12　　　　FIG 13

BUILDING VENTILATION SYSTEM

The present invention relates to a building, such as a hall, which has a ceiling comprised of spaced webs defining spaces therebetween.

The ceiling webs in buildings of this type may be of suitable synthetic resin, metal, asbestos cement or fabric and the like. In the known structures, the ceiling webs are held in position by supports such as frames, girders or the like. It has also been proposed to maintain a superatmospheric pressure within the chamber of the building enclosed by the ceiling so that this superatmospheric pressure will support the ceiling. It is furthermore known to maintain within the ceiling spaces a pressure exceeding that prevailing the building chamber enclosed by the ceiling. All of these conventional building and ceiling structures have the disadvantage of providing poor temperature insulation, causing water condensation on the ceiling webs, overheating when the ceiling is subjected to intensive sun rays, and poor acoustical conditions.

It is the primary object of this invention to avoid these disadvantages.

This object is accomplished in accordance with the invention with means for producng an air stream in at least one of the ceiling spaces, means being preferably provided for controlling the velocity of the air stream.

The air stream slowly flowing between the spaced ceiling webs has the effect of a heat insulating and sound damping layer. Heat received by an outermost one of the ceiling webs by radiation or convection is removed by the air stream in the ceiling spaces, thus keeping these spaces dry and avoiding the formation of water condensation on the webs.

While the building and ceiling may take any desired shape, the ceiling is preferably vaulted, tent-shaped or tunnel-shaped, thus providing an upper ceiling region around an apex of the ceiling, a lower region and an intermediate ceiling region connecting the upper and lower regions. It is preferred to have the air stream flow from the upper to the lower ceiling region. It may be useful also to provide for a radial air stream in vaulted ceilings or a longitudinal air stream in tunnel-shaped ceilings.

If desired, and as needed, the ceiling webs may be structured and/or surfaced, for instance by foaming, roughening or embossing, to increase the absorption of the energy of the sun and the heat insulation and/or to obtain acoustical effects.

The above and other objects, advantages and features of the present invention will become more apparent from the following description of certain now preferred embodiments, taken in conjunction with the accompanying schematic drawing wherein FIG. 1 is a transverse section of a vaulted ceiling enclosing a hall;

FIGS. 8, 9 and 10 are sectional views of various supports on which the ceiling webs are mounted; and FIGS. 11, 12 and 13 are sectional views of various modifications of spacers mounted between the ceiling webs.

Figure 1:
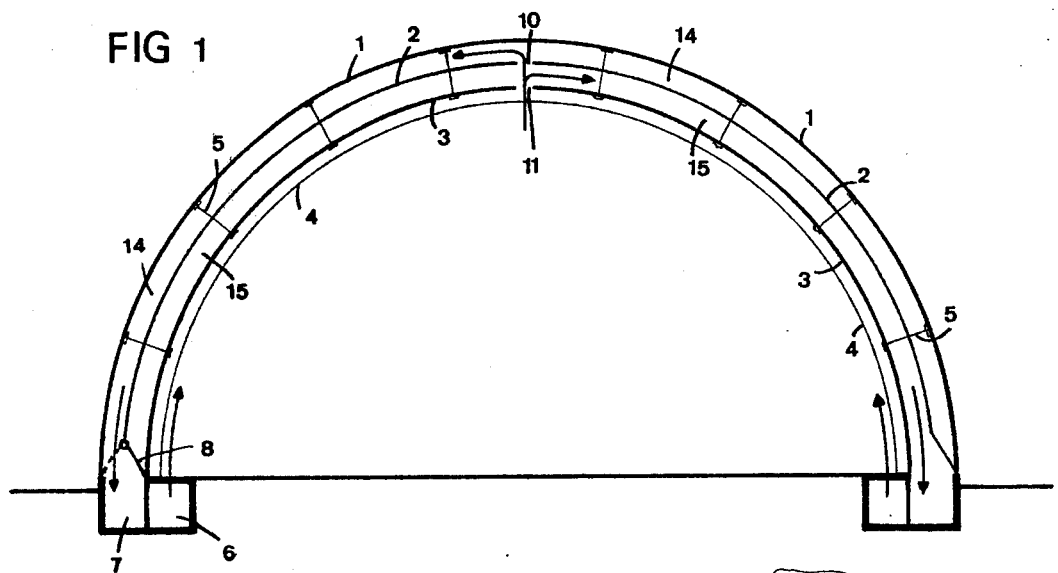
Figure 2:
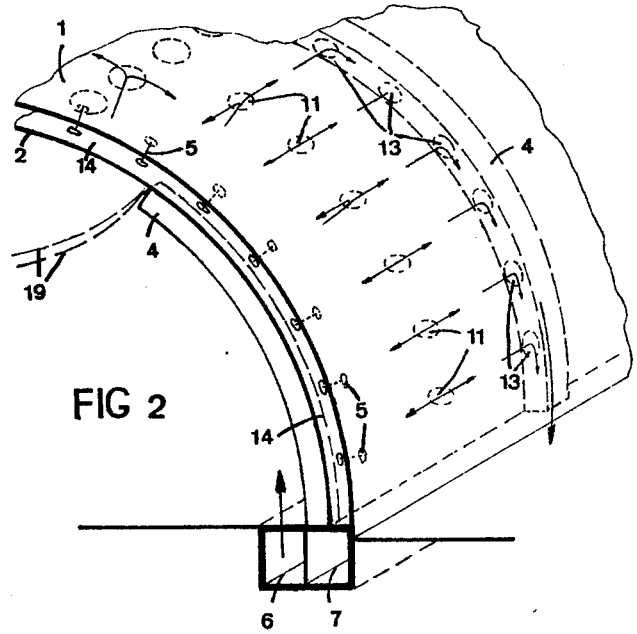
FIG. 2 is a perspective view of a portion of a modified ceiling.

Referring now to the drawing and first to FIGS. 1 and 2, the ceiling construction of the present invention is illustrated in conjunction with a large hall covered by a vaulted ceiling whose lower region rises from the floor of the hall to an upper region forming an apex of the ceiling which may be substantially hemispherical or semi-cylindrical. The illustrated ceiling has three webs 1, 2 and 3 spaced apart by spacers 5 to define spaces therebetween. The space defined between outer web 1 and intermediate web 2 is air-tightly closed off from the surrounding atmosphere which the outer web faces while intermediate web 2 and innermost web 3, which encloses the air-filled chamber of the building or hall, define openings 10 and 11 in the upper ceiling region, the illustrated ceiling web openings being in alignment with each other and the ceiling apex. Innermost ceiling web 3 is supported on a schematically shown girder structure 4 which holds the ceiling in place.

Air guide channel 7 is arranged adjacent the lower region of the ceiling and may be selectively in communication with space 14 and/or space 15 defined respectively between intermediate web 2 and the inner and outer ceiling webs, depending on the position of pivotal shutter or flap 8 arranged between the lower ends of spaces 14, 15 and channel 7. In this manner, air entering into spaces 14 and 15 from the hall and through openings 11 and 10 will stream through the spaces into channel 7.

It will be useful to mount an air conditioning unit and/or an heat exchanger in air guide channel 7 so that the air received from the building chamber may be conditioned before it is returned to the chamber through channel 6 which is adjacent channel 7 and receives the conditioned air. In the summer when outer ceiling web 1 is subjected to intensive sun radiation and thus absorbs a considerable amount of energy, the air streaming through space 14 will be heated. If a heat exchanger is arranged in air guide channel 7, this heat may be utilized in heating water or other devices requiring heat.

A ventilating installation may be so arranged in the building chamber and/or in air guide channel 7 that it produces a sufficient pressure differential to cause the air filling the chamber to be sucked through openings 10 and 11 into ceiling spaces 14 and 15 whence it passes into air guide channel 7 in a manner controlled by pivotal shutter 8 whence it slowly flows to be conditioned in the channel and to be returned back to the hall through channel 6.

Figure 3:
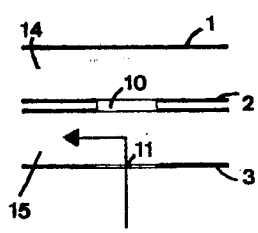
FIGS. 3, 4 and 5 illustrate various modifications of air stream flows through the spaces of a ceiling consisting of three spaced webs.
Figure 4:
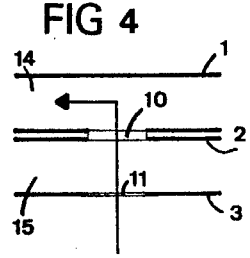
Figure 5:
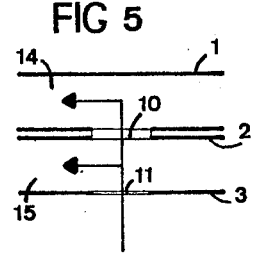

In this simple arrangement, the ceiling spaces are made part of the cooling and/or heating system of the building. In the summertime, the air in spaces 14 and 15, which functions as a ceiling insulation, is heated by the sun radiation impinged on the ceiling through the surrounding atmosphere and the heated air may be utilized through heat exchange in various installations in the building, which require heat. In the wintertime, on the other hand, heated air enters the ceiling spaces from the building chamber through opening 11. Shutters may be mounted in openings 10 to prevent the heated air from flowing into space 14, thus utilizing the air therein solely as an insulating layer against the ambient cold atmosphere. Mounting movable shutters in ceiling openings 10 and 11 makes it possible to control the air streams selectively to flow through spaces 14 and/or 15, as illustrated in FIGS. 3 to 5. This enables the arrangement to be readily adapted to atmospheric and inside temperature conditions to function most efficiently as an insulating and/or heating system and thus to enable any air conditioning and/or heating units in the building to operate at utmost economy.

When flap 8 is pivoted into the position shown in FIG. 1, left side, air will flow through space 14 into guide channel 7, as shown in FIG. 4. This will be normally the summer position, when the sun heats the air in outer space 14 while the air held in inner space 15 will function as an insulating layer. On the other hand, it may be desired to pivot flap 8 into the position shown on the right side of FIG. 1, in which case the air will stream through inner space 15 where it will remain as a stagnant insulating layer in outer space 14 of the ceiling, as illustrated in FIG. 3. When the atmospheric temperature is temperate, it may be desired to hold the flap at an intermediate pivotal position so that ceiling spaces 14 and 15 communicate with the air guide channel and the air is permitted to stream through both spaces, see FIG. 5.

The modification of FIG. 2 differs from the ceiling structure of FIG. 1 by providing only two ceiling webs defining single space 14 therebetween. The lower region of inner ceiling web 2 is supported by arcuate girders 4' which, if desired, could extend into space 14 defined between webs 1 and 2. Trusses 19 interconnect the upper ends of the oppositely positioned girders.

The innermost ceiling web again defines openings or air ports 11 in communication with the interior and space 14. Girders 4' are hollow to enable them to serve as air guide channels, the girder walls defining air ports 13 which receive the girder walls defining air ports 13 which receive the air from space 14 to establish an air stream passing into air guide channel 7. This arrangement produces a circumferentially flowing air stream in a domed or vaulted ceiling and a longitudinally flowing air stream in a tunnelshaped ceiling.

Figure 6:
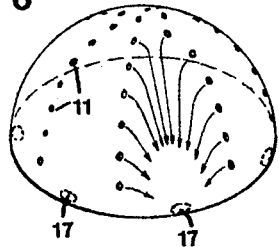
FIGS. 6 and 7 are perspective views of a hall enclosed by a vaulted ceiling, two alternative air stream flow patterns being shown in these figures.

In the embodiment of FIG. 6, air ports or openings 11 in the innermost ceiling web are distributed over all regions of the ceiling from the apex to the bottom thereof so that layers of air streams are formed in the ceiling space and the air is removed through ports 17 into an air guide channel.

Figure 7:
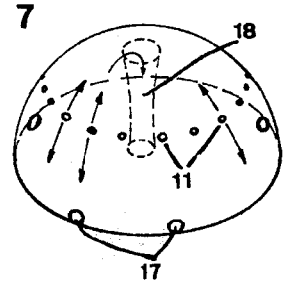

The vaulted ceiling illustrated in FIG. 7 has air ports or openings 11 in the intermediate region of the ceiling, a centrally positioned air guide channel 18 receiving and removing the air streaming upwardly from ports 11 while ports 17 receive and remove the downwardly stream air through an air guide channel. This division of the air stream in the ceiling space prevents the air from flowing too rapidly, a slow air stream in the ceiling spaces being desirable.

FIGS. 8 to 10 illustrate various supports for ceiling webs 1, 2 and 3. The ceiling webs have beaded edges wherein cables 41 are arranged. Girders or arches 42 of the ceiling support structure have peripheral grooves 43 shaped to receive the beaded edges with inserted cables 41. When the cables are pulled or tensioned, the beaded web edges are pressed into grooves 43 whereby the ceiling webs are simply and securely affixed to the supports. As will be appreciated from FIGS. 9 and 10, several beaded edges of webs 1 to 3 may be accomodated in a single groove 43.

FIG. 9 shows a support girder 42' which is generally H-shaped and has two grooves 43' shaped to receive U-shaped inserts 45 with bend-over edges 46. As shown in this figure, the recess in the inserts as well as the recess formed by the bend-over edges of the inserts may serve to receive the beaded edges of the ceiling webs with inserted cables 41.

The illustrated support structures are very useful in buildings where the ceiling webs are of a flexible material, such as films or fabrics, in which case the cables may be worked into the fabric.

If desired, the building chamber may contain air under superatmospheric pressure or at least one of the ceiling spaces may be under superatmospheric pressure to provide ceiling support without a structure.

FIGS. 11 to 13 illustrate various embodiments of spacers 5 mounted between the ceiling webs to maintain the webs in spaced relation. The illustrated spacers are load-supporting so as to be able to absorb pressures.

The spacer of FIG. 11 comprises rod 51 having a threaded end 52 and a support plate 54 at the opposite end thereof. The support plate of the spacer rod is shown in engagement with outer ceiling web 1 while the threaded end thereof passes through aperture 55 in ceiling web 2, aperture 55 being reinforced by elastic discs 56. Elastic body 58, which may be a plastic foam or a winding surrounding a plurality of adjacent spacers, if desired, surrounds spacer rod 51. The length of the elastic body originally exceeds that of rod 51 so that, when nut 53 is mounted on threaded rod end 52 and driven home, the elastic body of the spacer will be pre-tensioned. If desired, the elastic body may also consist of a series of elastic rings 57 mounted on the spacer rod and compressed by driving nut 53 home so as to provide a rigid spacer after assembly thereof. The number of rings will predetermine the spacing between the ceiling webs so that this spacing may be readily varied in construction.

In the spacer of FIG. 12, fastening element 60 is affixed to ceiling web 1 and the fastening element has eye 61 receiving end 64 of tie element 62 whose other end passes through aperture 55 and engages web 2 with its head 63. Under the pre-tension of elastic body 58, the tie element pulls the ceiling webs towards each other.

In FIG. 13, the tie element is replaced by band 65 having a rack-shaped end whose notches 66 may be engaged in a slot in reinforcing discs 56 by turning the band. Depending on which notch is engaged, the spacing between the ceiling webs may be varied.

The illustrated spacers are capable of elastically absorbing tensile and pressure forces. This prevents displacement of the fixing points on the respective webs through unavoidable inaccuracies in mass production of parts, as well as under loads, such as strong winds. Also, if means are provided for changing the length of the spacers for varying the distance between adjacent ones of the ceiling webs, the ceiling structure may be more readily adapted to different conditions. The elastic washers enables the parts to be assembled with some play and serve to balance such play.

What is claimed is:

1. In a building having a ceiling comprised of spaced webs of flexible material defining spaces therebetween; an innermost one of the webs enclosing an air-filled chamber of the building, the air in the chamber being under superatmospheric pressure; and the innermost web defining openings at an upper region of the ceiling in communication with the chamber and one of the spaces whereby air from the chamber is received in the one space and passes therethrough; and means for returning the air to the chamber at a lower region after it has passed through the one space, the air passing through the space and being returned to the chamber in a closed cycle.

2. In the building of claim 1, three of said spaced webs defining two of said spaces therebetween, an outermost one of the webs facing the surrounding atmosphere and the space defined between the outermost web and an intermediate one of the webs adjacent thereto being air-tightly closed off from the surrounding atmosphere.

3. In the building of claim 2, the intermediate web defining openings in communication with the spaces adjacent thereto.

4. In the building of claim 1, the ceiling being vaulted to enclose an air-filled hall, the vaulted ceiling comprising the upper region around an apex of the ceiling and the lower region extending down from the upper ceiling region; and an air guide channel in communication with at least one of the spaces in the lower ceiling region.

5. In the building of claim 1, the ceiling being vaulted to enclose an air-filled hall, the vaulted ceiling comprising a upper region around an apex of the ceiling, the lower region and an intermediate region connecting the upper and lower ceiling regions, the innermost of the webs defining openings in communication with the air-filled hall in the intermediate region, and separate air guide channel means in communication with at least one of the spaces in the upper and lower ceiling regions.

6. In the building of claim 1, spacers mounted between the webs to maintain the webs in spaced relationship.

7. In the building of claim 6, means for changing the length of the spacers for varying the distance between adjacent ones of the webs.

8. In the building of claim 1, the webs having beaded edges, cables in the beaded edges, and supports for the ceiling, the supports having grooves receiving the beaded edges with the cables.

* * * * *